July 27, 1948. G. H. PALM 2,445,887
CONTROL VALVE AND VIBRATING FLOW INDICATOR
Filed Dec. 11, 1941
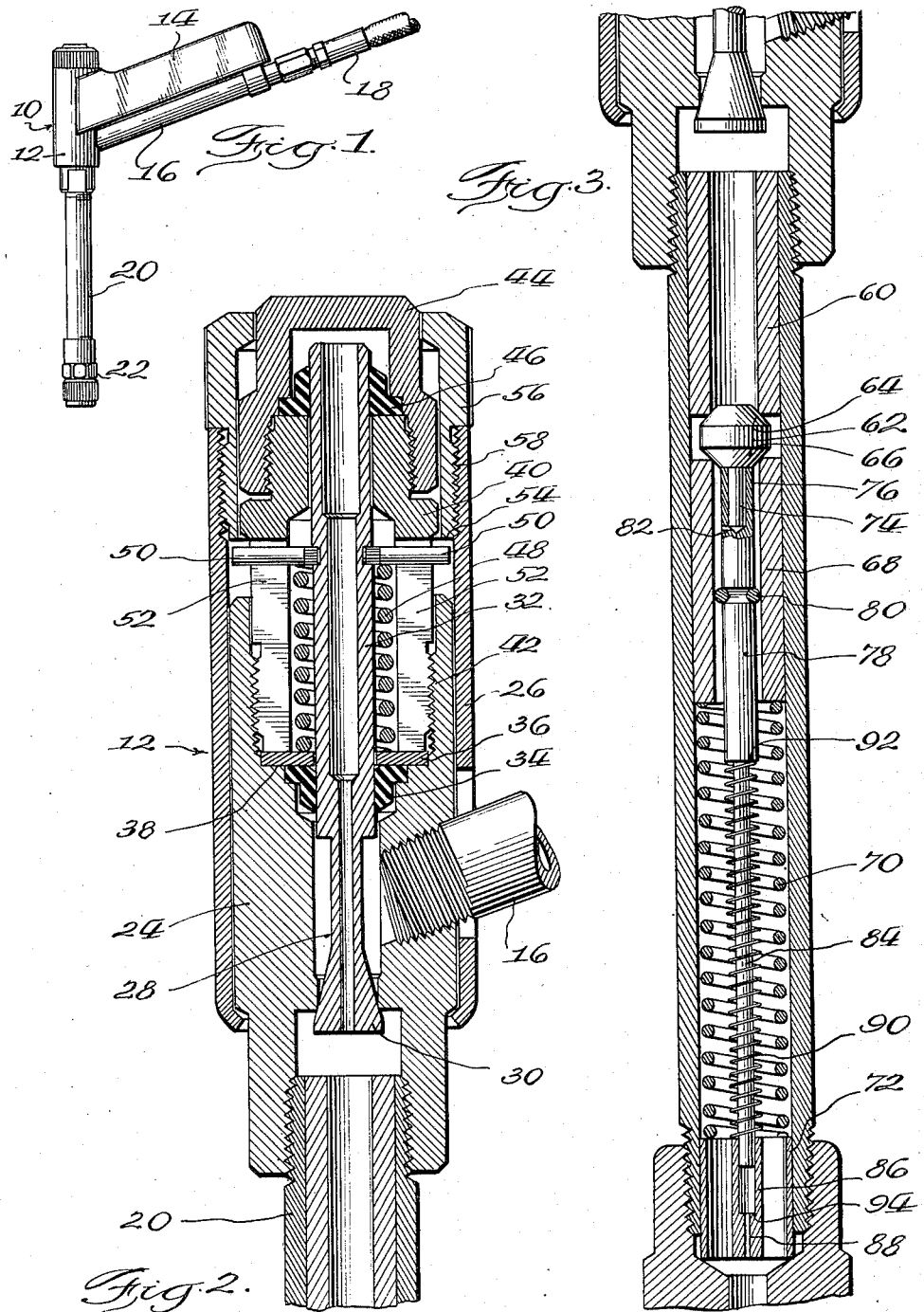
Inventor
George H. Palm
By Williams, Bradbury & Hinkle
Attys.

Patented July 27, 1948

2,445,887

UNITED STATES PATENT OFFICE 2,445,887

CONTROL VALVE AND VIBRATING FLOW INDICATOR

George H. Palm, Chicago, Ill., assignor to Stewart-Warner Corporation, Chicago, Ill., a corporation of Virginia Application December 11, 1941, Serial No. 422,514

2 Claims. (Cl. 222—125)

My invention relates to high pressure volume control valves of the kind particularly adapted for use in connection with lubricating apparatus for lubricating the bearings of automobiles and other machinery.

In lubricating the bearings of automobiles and other machinery, it is common to provide the bearing parts with nipples or fittings which are permanently attached thereto. A power operated compressor supplies lubricant under extremely high pressures, since the bearings frequently become clogged with a mixture of dirt and grease residue and such high pressures are necessary to dislodge this mixture and to force the fresh lubricant into the bearing parts and to the bearing surfaces.

The resistances of bearings to the introduction of fresh lubricant varies widely and consequently the lubricant pressure in the transmission line leading from the lubricant compressor to the fitting attached to the bearing likewise varies over wide limits.

My invention pertains to a volume control valve particularly adapted to be interposed in the line between the nipple or fitting and the lubricant compressor, so that an operator may manually control the flow of lubricant from the compressor to the bearing.

An object of my invention is to provide a high pressure volume control valve wherein the manual force for opening the valve which controls the flow of lubricant will be the same regardless of variations in lubricant pressure necessary to force fresh lubricant to the bearing surfaces.

Another object of my invention is to provide a high pressure volume control valve which will indicate to the operator the rate of flow of lubricant to the bearing.

Another object of my invention is to provide a high pressure volume control valve which is light and compact, simple and economical to manufacture, and which will give long and trouble-free use.

Other objects and advantages of my invention will become apparent as the description proceeds.

In the drawings,

Fig. 1 is a side elevation of a high pressure volume control valve embodying my invention.

Fig. 2 is a longitudinal section through the upper part of the device shown in Fig. 1 and shows in section the flow control valve and associated mechanism.

Fig. 3 is an axial section of the lower part of the device of Fig. 1 and shows in section a vibrator mechanism for indicating the rate of lubricant flow.

Referring to the drawings, and particularly to Fig. 1 thereof, I have illustrated a high pressure volume control valve designated generally by reference numeral 10. This valve has a body part 12 to which a handle 14 is attached. A pipe 16 connects the body part 12 with the discharge hose 18 of a lubricant compressor or other source of lubricant under pressure.

A tube 20 connects the body part 12 with a nozzle 22, adapted to be applied to a lubricant receiving nipple or fitting attached to a bearing. In the particular embodiment disclosed in the drawings, the nozzle 22 is of a type having an internal sealing surface and is adapted to make a sealed connection with a lubricant receiving fitting by pressing the nozzle against the inlet end of a nipple or fitting. This is accomplished by pressing downwardly on the handle 14 to urge the nozzle 22 against a nipple or fitting in a manner well understood in the art.

The details of the body part 12 are clearly shown in the enlarged sectional view designated as Fig. 2. Referring to this view, it will be seen that the body part 12 comprises a casting 24, having screw threaded engagement with one end of the pipe 16 and a sleeve 26 slidable lengthwise of the casting 24. The handle 14 is attached directly to this sleeve 26.

Lubricant admitted through the pipe 16 flows into a central bore 28, formed in the casting 24 and passage of this lubricant from the bore 28 to the tube 20 is normally prevented by tapered valve part 30, formed at one end of a tubular member 32. A hat washer 34 of leather, artificial rubber, or other suitable material, prevents the lubricant from flowing upwardly along the outside of the tubular member 32.

The hat washer 34 abuts against a metal washer 36 confined between a shoulder 38, provided by casting 24, and the lower end of a second casting 40, which threadedly engages the casting 24 as indicated at 42.

The casting 40 slidably receives the upper end of tubular member 32 and carries a cap 44, which effectively closes the upper end of this tubular member. A second hat washer 46 of leather, artificial rubber, or other suitable material, prevents leakage of lubricant downwardly along the exterior of the tubular member 32.

Tubular member 32 is normally held in valve closing position by a spring 48 confined between washer 36 and pins 50, pressed into or otherwise suitably secured to tubular member 32. These pins project outwardly through slots 52 formed in casting 40 and the ends of these pins are so positioned that they are adapted to be engaged by the lower end 54 of upper sleeve 56 threadedly attached to sleeve 26, as indicated at 58.

From the foregoing it will be apparent that the tubular member 32 is balanced with respect to the lubricant pressure in the tube 20 and nozzle 22 and is also balanced with respect to the lubricant pressure of the lubricant in supply pipe 16. Thus, the only force to be overcome in opening the valve 30 is the resistance of the spring 48 and this resistance is uniform for all variations of lubricant pressure.

I shall now describe the vibrator mechanism which I have provided to indicate the rate of flow of lubricant past the valve 30. Referring particularly to Fig. 3, it will be seen that a short fixed sleeve 60 is press fitted or otherwise secured in the upper end of tube 20. A valve 62 has a tapered surface 64 which seats on the lower end of the fixed sleeve 60. Valve 62 also has a second tapered surface 66 for seating on the upper end of a sliding sleeve 68 which is urged upwardly by spring 70 raised on spider 72.

Valve 62 has a downwardly projecting extension 74 slidable in the socket 76 provided in the upper end of vibrator stem 78, which has pinched out guiding portions 80 to guide this stem relative to sleeve 68. The lower end of socket 76 is provided with a lubricant relief passage 82.

Vibrator stem 78 has a reduced lower end 84 which is slidably received in a cylinder 86 provided by the spider 72. A passage 88 connects this cylinder with the interior of the nozzle 22 and tube 20. A spring 90 is confined between the spider 72 and shoulder 92 of the vibrator stem 78 and urges the vibrator stem and valve 62 upwardly.

I shall now describe the operation of my high pressure volume control valve. In using my invention, the nozzle 22 is first placed in sealing engagement with the lubricant receiving end of a nipple or fitting attached to a bearing part. Manual force is exerted on handle 14 to hold the nozzle 22 in sealing engagement with the nipple and to move sleeves 26 and 56 downwardly relative to castings 24 and 40. This causes the lower end 54 of sleeve 56 to engage pins 50 and move tubular member 32 downwardly to open valve 30.

Lubricant can now flow from pipe 16 past valve 30 into the upper end of tube 20. The only manual force required to open valve 30 is that force required to overcome the resistance of spring 48. Likewise the only force required to hold valve 30 open is the force required to overcome this spring 48 and this condition obtains for all variations in pressure of the lubricant flowing to the operating parts.

The rate of lubricant flow can be varied by varying the degree of opening of valve 30. When the valve 30 is fully open, the lubricant flows to the bearing under the full pressure at which this lubricant is supplied to my novel control valve, but since the control valve does not function as a booster, the lubricant cannot be supplied to the bearing at a pressure greater than that furnished by the lubricant compressor attached to the discharge hose 18. It is important that the operator have a reasonably accurate knowledge of the quantity of lubricant being supplied to the bearing parts and my invention provides vibrator mechanism which supplies this knowledge.

The lubricant entering the upper end of tube 290 flows downwardly through fixed 60, whose lower end is normally closed by valve or vibrator 62. The valve 62 is held against the lower end of sleeve 60 by the combined forces of springs 70 and 90. The force of the lubricant acting on the upper end of valve 62 forces this valve sleeve 68 and valve or vibrator stem 78 downwardly.

During this downward movement, valve 62 seals the upper end of tubular memebr 68 so that no lubricant can flow downwardly through this tube. Downward movement of vibrator 62 and vibrator stem 78 stops when the lower end of the vibrator stem engages the lower end 94 of cylinder 86. The sleeve 68, however, can and does continue to move downwardly, thus breaking the seal between the upper end of this tube and the valve 62 and permitting lubricant to flow through tube 68 to nozzle 22 and thence through the nipple to the bearing surfaces.

As soon as the seal between valve 62 and tube 68 is broken, valve 62 and valve stem 78 are moved upwardly by spring 90, since the lubricant pressure is the same above and below these parts. Sleeve 68 also returns upwardly under the force of its spring 70 and when the parts are returned to the position shown in Fig. 3 the action is repeated.

The reciprocation of the parts of the vibrator mechanism produces an audible clicking noise and also produces a vibration in the handle 14, which can be sensed by the operator. The frequency of the clicks and the frequency of vibration vary with the rate of lubricant flow and indicate to the operator, to a sufficiently accurate extent, the rate of lubricant flow to the bearing parts.

Attention is directed to the fact that the various parts are of rugged construction and can be easily made in large quantities by conventional machinery. I have specially designed my high pressure volume control so that no particularly close tolerances are required and all passageways are relatively large and are not easily clogged by impurities carried in the lubricant.

The spider 72 is held in place by the nozzle 22 and by merely unscrewing this nozzle from the tube 20 all of the movable parts of the vibrating mechanism may be readily removed for inspection, cleaning or replacement. This feature is important in providing long and trouble-free service under all conditions of operation.

While I have described my high pressure volume control valve as being designed for use with lubricating apparatus to lubricate the bearings of automobiles and other machinery, it will be understood that my invention is not limited to such use, but may be used to control the flow of any and all liquids and semi-liquids.

It is to be understood that my invention is not limited to the details shown and described, but may assume numerous other forms and that the scope of my invention is described by the following claims.

I claim:

1. A unitary, manually portable and manually operable lubricant control valve adapted to be connected to a source of lubricant under high pressure, said valve including a tube through which the lubricant flows, a valve part in said tube and a flow indicator, said indicator comprising a fixed sleeve in the end of said tube adjacent said valve part, a vibrator having an end adapted to seal against one end of said fixed sleeve, a sliding sleeve in said tube adapted to form a seal with the other end of said vibrator, a spring for urging said sliding sleeve toward said fixed sleeve, a spider providing an abutment for said spring, a cylinder provided by said spider, a vibrator stem having an end slidable in said cylinder, a second spring resting on said spider and urging said vibrator stem and vibrator toward said fixed sleeve, a nozzle secured to the outlet end of said tube and removably retaining said spider in said tube, and a passage connecting said cylinder with the interior of said nozzle.

2. A unitary, manually portable and manually operable lubricant control valve adapted to be connected to a source of lubricant under high pressure, said valve including a tube through which the lubricant flows, a valve part in said tube and a flow indicator, sad indicator comprising a fixed sleeve in the end of said tube adjacent a shoulder in the end of said tube adjacent said valve part, a vibrator having an end adapted to seal against said shoulder, a sliding sleeve in said tube adapted to form a seal with the other end of said vibrator, a spring for urging said sliding sleeve toward said shoulder, a cylinder, a vibrator stem having an end slidable in said cylinder, said cylinder limiting movement of said vibrator in one direction, means providing communication between said cylinder and a part of said tube outwardly of said sliding sleeve, a second spring urging said vibrator stem and vibrator toward said shoulder, and a nozzle secured to the outlet end of said tube.

GEORGE H. PALM.

REFERENCES CITED

The following references are of record in the file of this patent:

UNITED STATES PATENTS

| Number | Name | Date |
| --- | --- | --- |
| 2,141,925 | Miller | Dec. 27, 1938 |
| 2,136,261 | Anderson | Nov. 8, 1938 |
| 1,836,597 | Horman | Dec. 15, 1931 |
| 1,759,298 | Chapman | May 20, 1930 |
| 1,813,982 | Woodruff | July 14, 1931 |
| 1,891,586 | Woerner | Dec. 20, 1932 |
| 1,542,947 | MacKenzie | June 23, 1925 |
| 1,561,655 | MacKenzie | Nov. 17, 1925 |
| 1,981,905 | Davis | Nov. 27, 1934 |
| 2,295,237 | Rothwell | Sept. 8, 1942 |
| 1,637,085 | Nichols | July 26, 1927 |
| 1,882,215 | Ewald | Oct. 11, 1932 |
| 1,611,239 | Sanford | Dec. 21, 1926 |
| 1,733,441 | Barks | Oct. 29, 1929 |
| 2,067,298 | Watson | Jan. 12, 1937 |
| 1,946,275 | Collins | Feb. 6, 1934 |
| 571,023 | Scott | Nov. 10, 1896 |